United States Patent [19]
Bridges et al.

[11] 3,789,235
[45] Jan. 29, 1974

[54] FAR INFRARED COHERENT RADIATION SOURCE EMPLOYING CHARGE CARRIER SPIN NONLINEARITY IN A MAGNETIC FIELD

[75] Inventors: Thomas James Bridges, Holmdel; Van-Tran Nguyen, Matawan Twp., Monmouth County, both of N.J.

[73] Assignee: Bell Telephone Laboratories, Incorporated, Murray Hill, Berkeley Heights, N.J.

[22] Filed: Sept. 28, 1972

[21] Appl. No.: 292,875

[52] U.S. Cl. ............ 307/88.3, 321/69 R, 331/107 R
[51] Int. Cl. ............................................ H02m 5/06
[58] Field of Search........................ 307/88.3; 321/69

[56] References Cited
OTHER PUBLICATIONS
Brown et al., "Physical Review Letters," August 7, 1972, pp. 362–364.

*Primary Examiner*—Herman Karl Saalbach
*Assistant Examiner*—Darwin R. Hostetter
*Attorney, Agent, or Firm*—Wilford L. Wisner

[57] ABSTRACT

There are disclosed far infrared coherent radiation sources in which a sample of material capable of spin-flip transitions is subjected to an adjustable magnetic field and pumped by at least one coherent light beam. Some of the sources generate both tunable spin-flip laser radiation and far infrared radiation at the tunable spin-flip (or spin resonance) frequency. Others of the sources provide mixing of two input coherent radiations of adjustable frequency to produce phase-matched far infrared coherent radiation at the difference frequency which substantially coincides with the spin-flip frequency. In all of these sources only one crystal of the material is typically subjected to the magnetic field. A particular advantage of these sources is the possibility of tuning the far infrared output over a wide frequency range. An important aspect of the invention is that phase-matching greatly enhances the far infrared output.

16 Claims, 6 Drawing Figures

FAR INFRARED COHERENT RADIATION SOURCE EMPLOYING CHARGE CARRIER SPIN NONLINEARITY IN A MAGNETIC FIELD

BACKGROUND OF THE INVENTION

This invention relates to far infrared coherent radiation sources, that is, those having output frequencies in the range between about 300 GHz and 30,000 GHz.

Much recent effort in the laser art has been directed to filling in the gap in the radiation spectrum from man-made sources in the frequency range between about 300 GHz and 30,000 GHz. This frequency range lies above the microwave and millimeter-wave ranges and below the near infrared range in frequency and is usually called the far infrared range of sometimes the sub-millimeter wave range, since all the wavelengths therein are shorter than one millimeter. This spectral ragion has been very little investigated because of the lack of tunable sources. While many apparatuses have been tried for the difference mixing of visible of near infrared laser beams to generate radiation in this range, most of them have been strong or efficient sources and have not been tunable. Also, specific lasers developed in this wavelength range have operated at fixed frequencies and have typically not been sufficiently easy to control.

One of the difficulties with prior art nonlinear optical devices for difference frequency generation of far infrared radiation has been the weakness of nonlinear effects of known type, which rely on nonlinearities of the electronic and ionic vibrations of the crystal.

Very recently, we have experimentally demonstrated a new nonlinear optical effect employing the electronic spin system of a semiconductive material, (in this case indium antimonide (InSb)), subjected to a magnetic field. Other materials usable are generally those which have heretofore proven useful in the so-called spin-flip or spin reversal Raman laser described in U.S. Pat. Nos. 3,470,453 and 3,626,199 to P. A. Fleury, V et al.

The theory of this effect was also presented by Terrence L. Brown and P. A. Wolff, *Physical Review Letters*, 29, 362 (Aug. 7, 1972 ). It was shown experimentally and theoretically that the nonlinearity of the spin system was many times stronger than the nonlinear effect of known type for the process of far infrared generation by difference mixing. The new second order nonlinearity of the spin system is very closely related to the third order Raman nonlinearity made use of in the above-mentioned spin-flip Raman laser. The pump frequency and the spin flip Raman laser frequency, the so-called Stokes frequency, differ by the spin flip or spin resonance frequency. While the Raman laser frequency is relatively close to the near infrared or visible pump frequency, the spin flip or spin resonance frequency is always in the far infrared. The new effect is resonant both when the far infrared difference frequency is close to the spin flip (or spin resonance) frequency and also when the frequency of the input radiation approaches the band gap frequency of the material.

SUMMARY OF THE INVENTION

Our invention uses a single crystal of suitable material together in one species thereof, with input radiation from two step-wise or continuously tunable lasers to generate from the spin nonlinearity under selected conditions an enhanced far infrared output which is step-wise or continuously tunable over a wide frequency range.

In another embodiment of the invention, the single crystal is operated as a spin flip Raman oscillator. The single input radiation or "pump" mixes internally in the crystal with the locally generated Raman scattered light via the spin nonlinearity. The resulting far infrared radiation is automatically at the spin flip (or spin resonance) frequency for which the effect is strongly resonant. The far infrared frequency is continuously tunable by variation of the magnetic field and is not dependent on the pump frequency, which may however, be adjusted to provide phase-matching conditions.

It is one aspect of our invention that the strength and efficiency of the nonlinear effect is greatly enhanced by phase matching the three radiations.

Subsidiary features of our invention reside in particular phase-matching structures and combinations and arrangements of components providing phase-matching conditions.

In order to avoid deleterious absorption of the far infrared radiation by the free carriers in the crystals the plasma frequency preferably is less then the far infrared frequency. For the frequency range of interest and for InSb as an example, this preference is satisfied by samples with less than about $10^{16}$ charge carriers per cubic centimeter and desirably less than $3 \times 10^{15}$ carriers per cubic centimenter. In both of the above embodiments of the invention the strength of the observed effect may be greatly enhanced by using input radiation of frequency close to, but not exceeding, the frequency corresponding to the band gap of the semiconductor material. This enhancement results from a resonance of the nonlinear mixing effect.

It is a further specific feature of our invention that beneficial phase-matching in a far infrared generator or mixer in such a sample of material is advantageously provided by adjusting the input frequency or frequencies sufficiently close to the bandgap frequency. The refractive indices of the material at the different frequencies involved is adjusted by selection of the offset of the pump frequency from the bandgap to give a condition of phase match and hence constructive build-up of the far infrared signal throughout the whole length of the sample. Nevertheless, in order to be able to adjust the input frequency independently of phase match, (for example, to approach the band gap resonant condition, mentioned above, more closely for enhancement of the nonlinearity) a further control of phase matching is desirable. This may be achieved by adjusting the refractive indices with a variation of sample temperature.

Yet another method of adjusting the phase-matched condition is achieved by using the contribution of the free carriers themselves to the refractive index at the far infrared frequency. This contribution, which is dependent on the free carrier density, may be predetermined to the correct value by choosing a precise degree of impurity doping. While the impurity concentration does not necessarily change the refractive index much, its contribution is significant when even a small change provides phase-matching. Alternatively, the free carrier density may be adjusted in situ by one or more of several different mechanisms. These mechanisms would include (a) impact ionization by passing an electric current through the sample, (b) optical pumping by a suitable optical source either directly across the band gap, or by two photon absorption, or from an impurity level to the conduction band, and (c) electron beam pumping.

In a final method of phase-matching, a thin film waveguide structure is used in which the sample is a thin film on a lower index substrate and has on one surface thereof a phase-matching diffraction grating.

In a third species of the invention, the single crystal sample has inhomogeneous properties along its length. The free carrier concentration is optimized separately in different parts of the crystal for the spin flip Raman oscillator and for the mixing. The spin flip Raman oscillator would normally comprise the whole crystal, while only a portion of the crystal would efficiently exercise the mixing function. This separate optimization may be made by different impurity doping concentrations in different parts of the crystal. The various means described above for adjusting the carrier concentration might also be used, that is, either impact ionization by electric current, optical pumping, or electron beam pumping.

It is a specific optional feature usable with all the above species of the invention that beneficial resonance of the far infrared radiation may be further promoted by a suitable optical resonator. In a similar way the pump or the spin flip laser (Stokes) frequencies might also be benefically resonated.

BRIEF DESCRIPTION OF THE DRAWING

Further features and advantages of our invention will become apparent from the following detailed description taken together with the drawing in which.

DESCRIPTION OF ILLUSTRATIVE EMBODIMENTS

Figure 1:
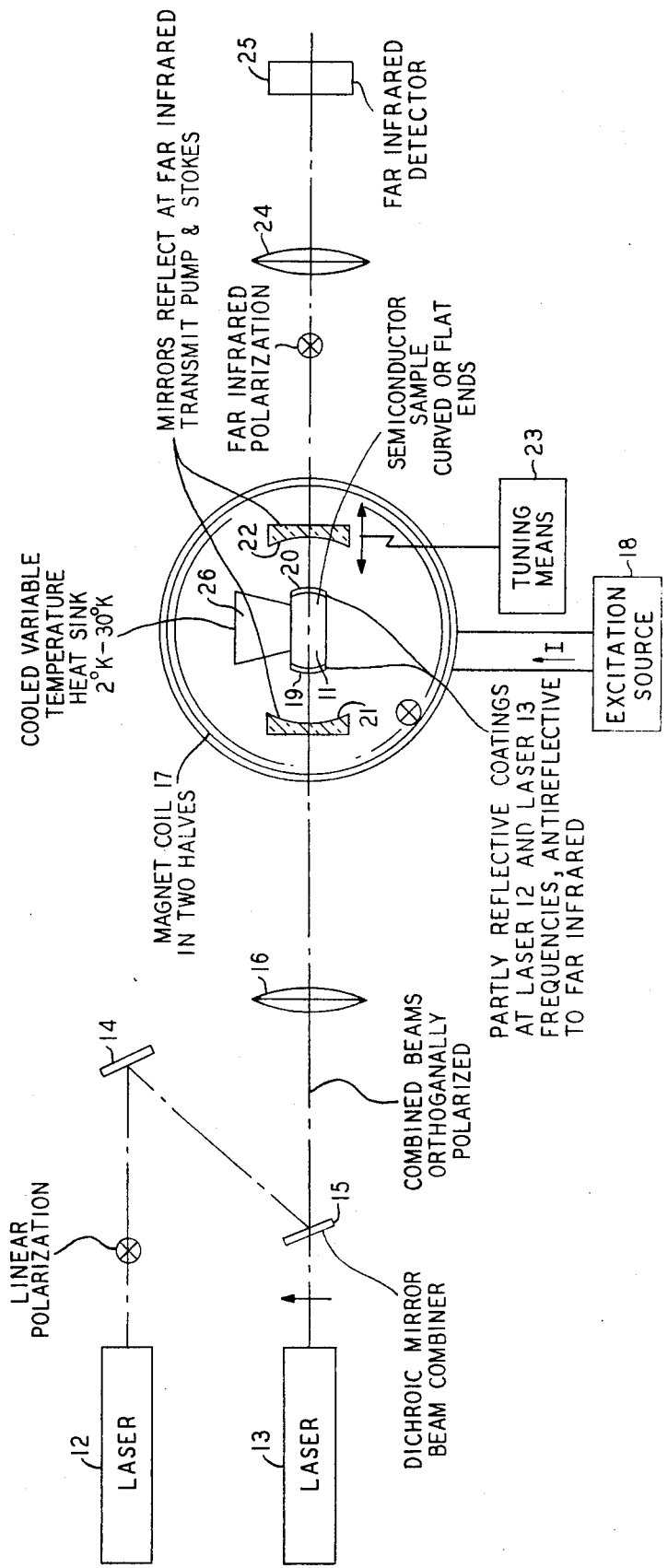
FIG. 1 is a partially pictorial and partially block diagrammatic illustration of a phase-matched mixer according to our invention.

In the embodiment of FIG. 1 it is desired to obtain tunable far infrared radiation from a semiconductive sample 11, for example n-type indium antimonide by pumping it with coherent radiation at two different frequencies lower than its bandgap frequency from lasers 12 and 13, respectively. These frequencies are desirably, but not necessarily, near the bandgap of sample 11. Lasers 12 and 13 are illustratively carbon monoxide molecular lasers operating on selected different emission lines near 5.3 micrometers in the near infrared and providing mutually orthogonal polarizations at the dichroic mirror 15 which serves as a beam combiner. The orthogonal polarizations of the two lasers insure that their magnetic fields will have a cross-product that drives the electronic spin system of sample 11. The polarization of laser 12 is orthogonal to the plane of FIG. 1; and the polarization of laser 13 lies vertically in the plane of FIG. 1 as indicated. Mirror 14 directs the beam from laser 12 to the dichroic beam combiner 15.

The sample 11 is subjected to a magnetic field parallel to the polarization vector of laser 12 and perpendicular to the direction of propagation by means of the magnetic coil 17 which is composed of two halves laterally spaced on opposite sides of the optical transmission axis through sample 11. In other words, one half would be closer to the observer than sample 11 and the other half would be behind sample 11 with respect to the observer.

In order to provide efficient difference frequency mixing, the coil 17 is excited by an excitation source 18 providing a field that causes the spin-flip frequency to coincide with the difference frequency of lasers 12 and 13. Efficiency is further promoted by reflective coatings 19 and 20 on the end surfaces of sample 11. These coatings are reflective at the frequencies of laser 12 and laser 13, and are transmissive to the far infrared radiation. The far infrared radiation itself is resonated by mirrors 21 and 22, the latter being partially transmissive at the far infrared frequency; and both being transmissive at the frequencies of laser 12 and laser 13. The beams from lasers 12 and 13 are focused by a lens 16 into the sample 11 through reflectors 19 and 21.

The output reflector 22 is mounted for axial movement with respect to reflector 21 in response to tuning means 23 in order to tune the resonance of the resonator for the far infrared radiation. Beyond the output reflector 22 is disposed the collecting lens 24, which focuses the output far infrared radiation into detector 25 or other suitable utilization apparatus.

In the operation of the embodiment of FIG. 1, we provide that one laser has an essentially fixed frequency, while the other laser is adapted to be tuned, either in a stepwise fashion or continuously by significant amounts. For example, in the case of the carbon monoxide laser 13, such stepwise tuning is possible by tuning to different vibrational-rotational lines of the CO molecule. If a high pressure molecular laser is employed with transverse discharge excitation, a substantial broadening of the discrete vibrational-rotational molecular emission lines is obtained, enabling a degree of continuous tuning.

At the same time the spin-flip frequency of sample 11 is varied to substantially coincide with the difference frequency of lasers 12 and 13 by changing the value of current supplied to coil 17. The conditions for efficient oscillation are simultaneously maintained by mounting the sample 19 on a cold finger at 26 which is cooled by liquid helium and which may have any selected temperature between about 2 degrees and 30 degrees Kelvin. The cold finger 26 is an efficient heat sink for the sample 11 and allows the choice of a temperature at which the anomalous dispersion of sample 11 across the reststrahl region provides phase-matched propagation of laser 12, laser 13 and far infrared frequencies therein Similarly, the far infrared radiation is efficiently resonated, as the difference frequency and spin-reversal frequency are varied, by actually moving mirror 22 in response to tuning means 23 to tune the far infrared radiation resonator.

Further details of our early experiments are as follows. A weaker non phase-matched mixing was obtained with synchronously Q-switched carbon dioxide lasers, each operating at wavelengths near 9.6 micrometers or 10.6 micrometers, both with a difference frequency as described above. Their repetition rate was 250 Hz and they generated linearly polarized pulses that were about 250 nanoseconds long and had peak powers of about 1 KW. Specifically, the difference frequency was fixed at 90.1 wave numbers ($cm^{-1}$). The doping of the n-type indium antimonide sample 11 was approximately $2.2 \times 10^{15}$ per cubic centimeter and its dimensions were $3 \times 3 \times 4$ millimeters with the long dimension along the direction of propagation.

In the particular geometry used the crystal orientation was such that the generated far infrared radiation from both the conventional second order nonlinearity and the stronger conduction electron spin nonlinearity were polarized with the electric fields parallel to the magnetic field direction. For this geometry, the contribution of free electrons to the complex refractive index at far infrared frequencies is independent of the magnetic field strength and identical for both effects, enabling a direct comparison of the strength of the new effect to the known conventional effect.

In another initial experiment the effective peak power input from laser 12 was 168 W and that from laser 14 was 40 W. The power output at the far infrared radiation resonance peak was about 0.4 microwatts.

In both cases, to verify that the enhancement in the nonlinear mixing arises from the conduction electron spin-reversal nonlinearity, we changed the geometry so that the polarization of the radiation from laser 13 was also parallel to the magnetic field direction. The verification was obtained in that the power output was then small and independent of the magnetic field, as would be expected for the conventional second order nonlinear effect.

A reduction in line width of the far infrared radiation was obtained by reducing the input powers of sources 12 and 13 to 69 W and 16 W, respectively. The linewidth was thereby reduced from about 200 Gauss to about 114 Gauss. The measured effective nonlinear coefficient in this case was about 5.4 times larger than the conventional second order nonlinear coefficient of indium antimonide.

Figure 2:
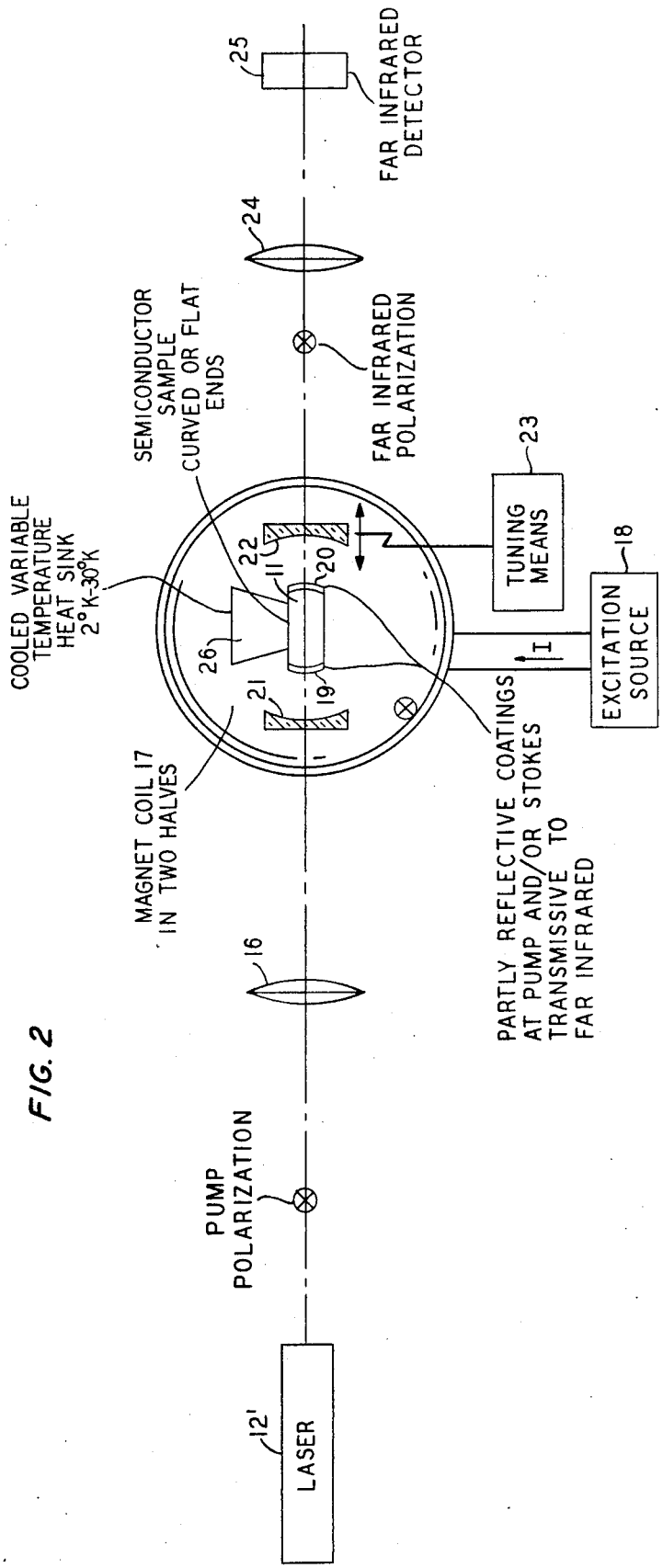
FIG. 2 is a partially pictorial and partially block diagrammatic illustration of a phase-matched spin-flip Raman oscillator and mixer according to our invention.

In the embodiment of FIG. 2, spin-flip Raman oscillation is obtained in the sample 11 with a single pumping laser source 12' providing a beam polarized perpendicular to the plane of the Figure and parallel to the magnetic field and introduced therein by essentially the same components as in the embodiment of FIG. 1. The pumping radiation from laser 12 now generates the Raman-shifted, or Stokes, radiation. The frequency of the latter radiation is shifted from the pump frequency by the spin-flip (spin resonance) frequency. Provision is made to insure that the build-up of the far infrared radiation via the spin-flip nonlinearity of the conduction electron is not impeded by excessive free electron absorption. To this end, the free-electron concentration of sample 11 is selected to be below about $1 \times 10^{16}$ per cubic centimeter and desirably as low as $1 \times 10^{15}$ per cubic centimeter.

In other respects, the embodiment of FIG. 2 is the same as that of FIG. 1.

In operation of the embodiment of FIG. 2, the interaction of the pump and the Stokes waves to produce a far infrared coherent output from sample 11 in response to the single coherent input radiation can still be considered a parametric interaction in which phase-matching is desirable, for example, by adjustment of the pump frequency and by variation of the sample temperature via cold finger 26.

As in the embodiment of FIG. 1, most efficient operation of the embodiment of FIG. 2 and easiest phase-matching by means of an anomalous dispersion are obtained if laser 12 oscillates in the vicinity of about 5.3 micrometers.

Indeed, in the latter case, if the carrier concentration in sample 11 is sufficiently low, variable temperature phase-matching may not be necessary because a sufficiently long coherence length may be obtained at a fixed liquid helium temperature that a useful far infrared radiation output is still obtained.

Figure 3:
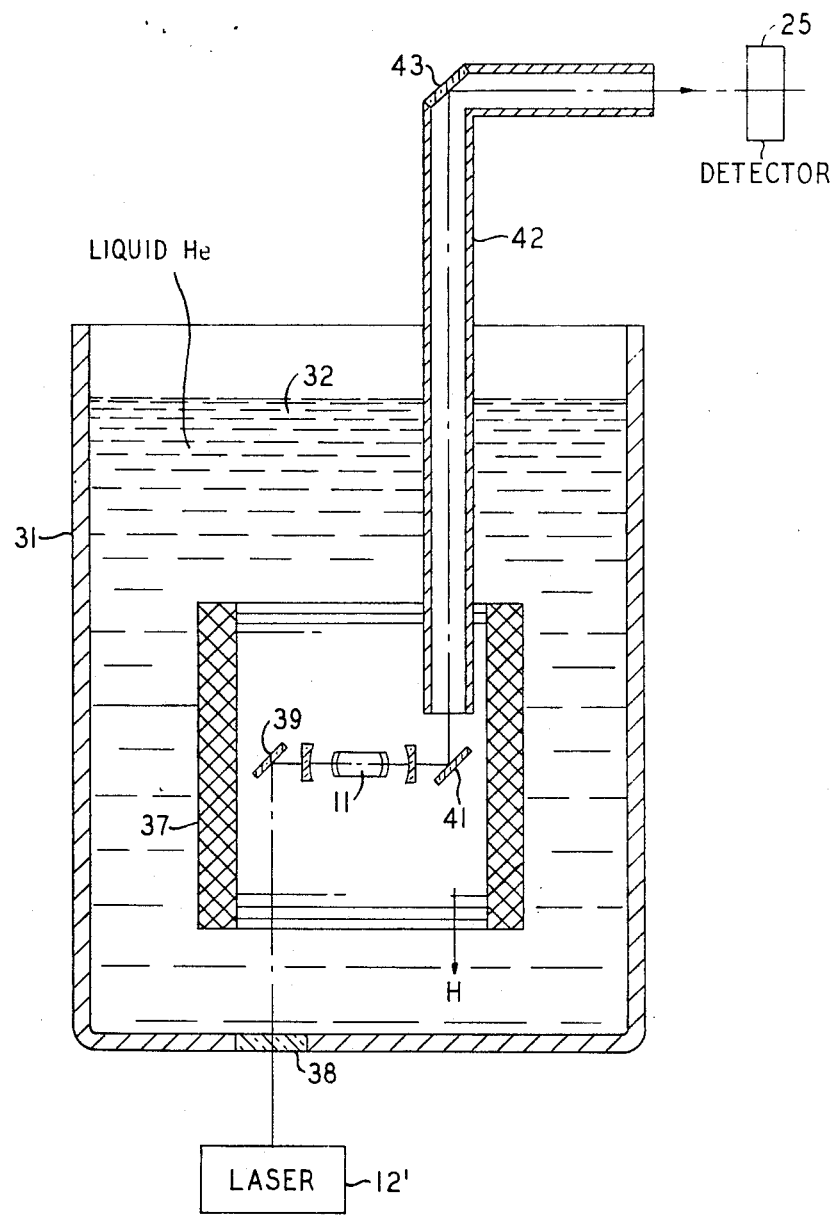
FIG. 3 is a pictorial illustration of a modification of the embodiment of FIG. 2 in which the sample is immersed in liquid helium and a superconducting magnet is used together with a light pipe to transmit the output far infrared radiation.

A modified embodiment based on this premise is shown in FIG. 3. Here the sample 11 is disposed in a container 31 containing a bath of liquid helium 32; and a superconducting magnetic field coil 37 is also disposed therein. The relative orientations of the polarization of radiation from laser 12', the crystal axis of sample 11, and the magnetic field direction of coil 37 remain relatively the same as in FIG. 2, even though the view of FIG. 3 is taken at 90° with respect to the view of the sample shown in FIG. 2.

The coil 37 can be continuous instead of in halves, if the pumping beam is introduced through a window 38 of container 31 and through the end of coil 37 via the 45° reflector 39 and is coupled therefrom also by a 45° reflector 41 within the coil 37.

A light pipe arrangement is now desirable to conduct the output radiation from reflector 41 to the ultimate detector or utilization apparatus 25. Such a light type arrangement is provided by the hollow conduit 42 which includes a 45° reflector 43 at the bend therein.

Figure 4:
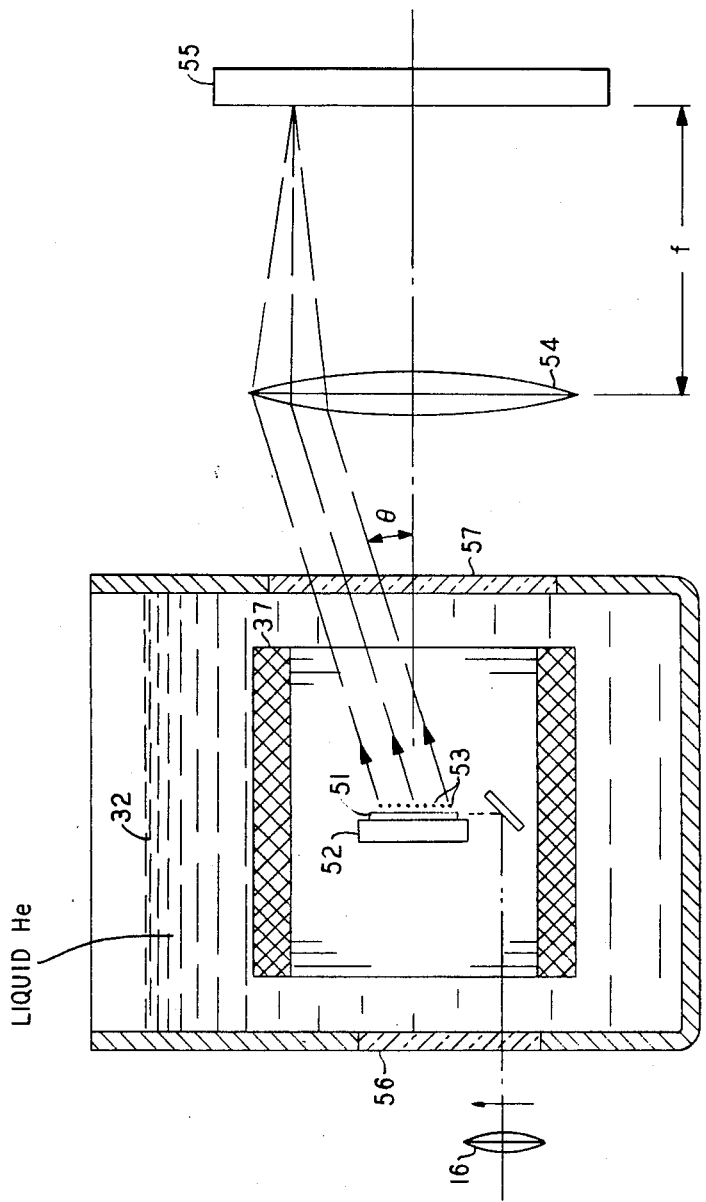
FIG. 4 is a partially pictorial and partially block diagrammatic illustration employing a specific phase-matching structure.

In a similar liquid helium bath, the need for tuning by anomalous dispersion can be avoided and higher pump powers can be used, e.g., pumping radiation from a carbon dioxide molecular laser if a phase-matching structure, such as that shown in FIG. 4 is employed.

In FIG. 4 the coil 37 is again unitary, but the active sample is now the thin film indium antimonide sample 51 disposed on the lower refractive index substrate 52. On the surface of thin film 51 is formed a series of ridges or grooves 53 that form a diffraction grating to which the far infrared frequency is responsive. In particular, the grating spacing is chosen to modify the phase propagation constant of the far infrared radiation to provide phase-matching between that generated radiation, the pump radiation and Stokes radiation as a three-frequency phase-matched process, for which the appropriate mathematical relationships are well known. The grating effect is represented by vector quantity like a phase propagation constant, the so-called grating constant. The novel feature in this embodiment is again the production of both the Stokes coherent radiation and the far infrared coherent radiation in the same thin film sample 51. The pumping light may be introduced into sample 51 by an appropriate input coupler (not shown), such as a prism or separate grating of known type. The far infrared radiation will propagate from the thin film sample at an appropriate angle $\theta$ characteristic of the spin-flip frequency and the parallel rays of far infrared radiation can be brought to a focus at apparatus 55 in a position characteristic of their frequency.

Figure 5A:
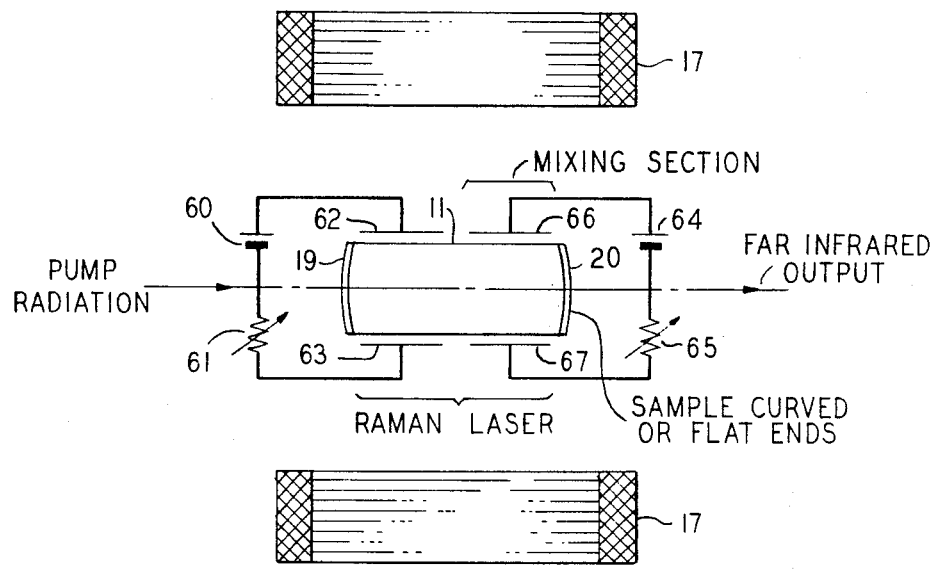
FIGS. 5A and 5B are pictorial illustrations of embodiments in which the crystals have inhomogeneous free-carrier concentrations.
Figure 5B:
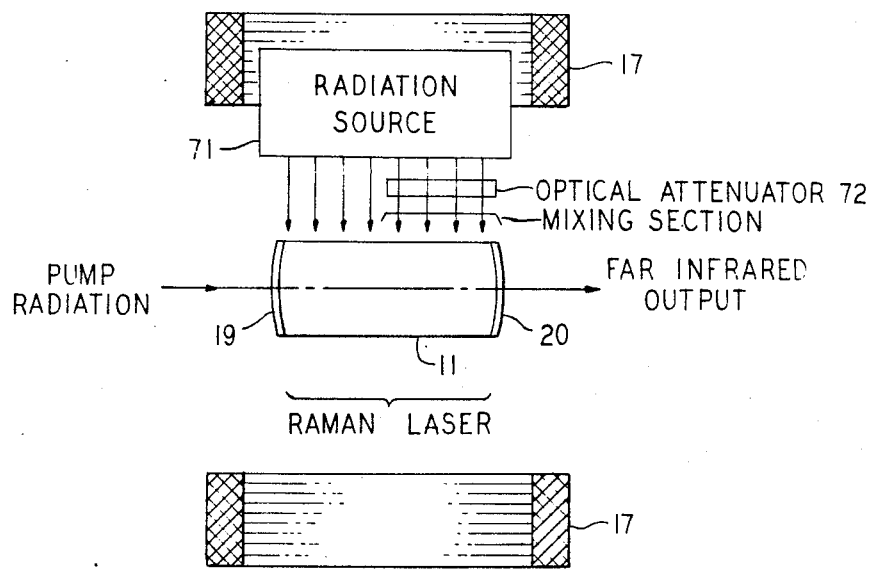

In the modifications of FIGS. 5A and 5B, which may be applied to the embodiments of FIGS. 2 and 3, a variation of free carrier concentration is achieved along the sample length. This variation may be desirable since the carrier concentration optimum for spin-flip Raman oscillation may be so high that free carrier absorption at the far infrared frequency is excessive and phase matching is impossible. In samples of low concentration (e.g., $\gtrsim 5 \times 10^{15}$ per cubic centimeter in n-type Indium Antimonide) above a certain low magnetic field the carriers are "frozen out" and are no longer available for the spin resonance process. In such case the carriers may be partially or totally ionized by external means to produce a nonuniform carrier density along the crystal length. In FIGS. 5A and 5B, for example, a sample has two sections with carrier density increased by external means by different amounts.

In FIG. 5(A) the increase is produced by impact ionization due to an electric current supplied by batteries 60 and 64 and variable resistors 61 and 65 to electrodes 62, 63, 66 and 67 applied to the sample.

In FIG. 5(B) the increase in carrier density is produced by optical pumping with a suitable source 71, and is adjusted in intensity by optical attenuator 72 in one section of the crystal. The optical pumping occurs either directly across the bandgap, by two-photon absorption, or by excitation from an impurity level. The frequency of source 71 is chosen accordingly. For two-photon absorption, a carbon dioxide laser is appropriate. The mixing section is included inside the Raman laser resonator, taking advantage of the enhanced fields therein.

We claim:

1. A far infrared coherent radiation source comprising a sample of a semiconductive material transmissive in both a first frequency range above about 30,000 GHz and in a second frequency range between about 300 GHz and 30,000 GHz, means for applying a magnetic field to said sample to provide a spin-flip frequency in said second frequency range and means for pumping said sample with at least a first coherent beam of radiation in said first frequency range, said sample and said pumping means being mutually oriented for phase-matched generation of at least a coherent radiation at the spin-flip frequency in a three-frequency interaction.

2. A far infrared coherent radiation source according to claim 1 in which the pumping means comprises sources of first and second coherent beams in the first frequency range, said sources supplying beams having a frequency difference equal to the spin-flip frequency and having mutually orthogonal polarizations.

3. A far infrared coherent radiation source according to claim 2 in which the first and seocnd pumping sources are lasers operating near the bandgap of the sample or semiconductive material to provide the phase-matching by anomalous dispersion in the sample.

4. A far infrared coherent radiation source according to claim 2, in which the magnetic field applying means includes means for varying the magnetic field, said source including means for varying the temperature of the sample to facilitate phase-matching of the radiations therein and means external to said sample for resonating the far infrared radiation generated therein at the spin-flip frequency, including means for tuning said external resonating means in frequency to track the spin-flip frequency as the magnetic field varies.

5. A far infrared coherent radiation source comprising a sample of a semiconductive material transmissive in both a first frequency range above about 30,000 GHz and in a second frequency range between about 300 GHz and 30,000 GHz, means for applying a magnetic field to said sample to provde a spin-flip frequency in said second frequency range, means for pumping said sample with a coherent beam of radiation in said first frequency range to drive both laser action at a frequency that is Raman shifted from the pump frequency by the spin-reversal frequency and to drive a second coherent radiation at said spin-flip frequency.

6. A far infrared coherent radiation source comprising a sample of a semiconductive material transmissive in both a first frequency range above about 30,000 GHz and in a second frequency range between about 300 GHz and 30,000 GHz, means for applying a magnetic field to said sample to provide a spin-flip frequency in said second frequency range, and means for pumping said sample with a coherent beam in said first frequency range, said sample and said pumping means being mutually adapted for generation of a first coherent radiation at said spin-flip frequency and a second coherent radiation at a frequency equal to the difference of the pump freqnuency and spin-reversal frequency, the beam of said pumping means having a selected frequency offset from the bandgap frequency of said sample to phase-match both generated radiations to said pumping beam.

7. A far infrared coherent radiation source according to claim 6 in which the pumping means provides a coherent pumping beam polarized parallel to the direction of the magnetic field.

8. A far infrared coherent radiation source according to claim 6 including means for providing a selected temperature of the sample.

9. A far infrared coherent radiation source according to claim 6, inlcuding a grating structure for phase-matching the pumping coherent beam with the Raman shifted radiation and the far infrared radiation.

10. A far infrared coherent radiation source according to claim 5 including means for increasing the density of charge carriers in a first region of said sample, traversed by the beam of the pumping means before a second region of said sample, said second region of said sample having a charge carrier density less than that in the first region.

11. A far infrared coherent radiation source according to claim 10 in which the means for increasing the charge carrier density in the first region comprises means for creating an essentially static electric field across said first region with a gradient sufficient to produce impact ionization in said first region.

12. A far infrared coherent radiation source according to claim 10 in which the means for increasing the charge carrier density in the first region comprises an external optical source and means for directing radiation from said source into said first region to produce substantial numbers of additional charge carriers therein.

13. A far infrared coherent radiation source accordint to claim 1 in which the sample has a particular impurity concentration that modifies the free carrier concentration to facilitate the phase-matching, the impurity concentration making a significant contribution to refractive index.

14. A far infrared coherent radiation source according to claim 10 in which the means for increasing the charge carrier density in the first region comprises a first means for supplying a first essentially static electric field across said first region, said source including a secnd means for supplying a seocnd essentially static electric field across said second region, said second field being less then said first field.

15. A far infrared coherent radiation source according to claim 5 including means encompassing the sample for resonating the far infrared radiation, said sample having two regions of differing carrier concentrations, said two regions having differing dopant impurity concentrations.

16. A far infrared coherent radiation source according to claim 6 in which the pumping means provides the coherent pumping beam with an adjustable frequency to facilitate the phase-matching of both generated radiations to the pumping beam.

* * * * *

Disclaimer 3,789,235.—*Thomas James Bridges*, Holmdel, and *Van-Tran Nguyen*, Matawan township, Monmouth County, N.J. FAR INFRARED COHERENT RADIATION SOURCE EMPLOYING CHARGE CARRIER SPIN NONLINEARITY IN A MAGNETIC FIELD. Patent dated Jan. 29, 1974. Disclaimer filed July 2, 1974 and Feb. 5, 1975, by the assignee, *Bell Telephone Laboratories, Incorporated*.

Hereby enters this disclaimer to claims 1, 2 and 5 of said patent.

[*Official Gazette May 13, 1975.*]